United States Patent [19]

Brakus

[11] Patent Number: 4,669,039
[45] Date of Patent: May 26, 1987

[54] CIRCUIT ARRANGEMENT FOR AUTOCONVERTERS

[75] Inventor: Bogdan Brakus, Puchheim, Fed. Rep. of Germany

[73] Assignee: Siemens Aktiengesellschaft, Berlin and Munich, Fed. Rep. of Germany

[21] Appl. No.: 731,738

[22] Filed: May 8, 1985

[30] Foreign Application Priority Data

May 10, 1984 [DE] Fed. Rep. of Germany ....... 3417356

[51] Int. Cl.[4] .......................................... H02M 3/335
[52] U.S. Cl. ...................................... 363/71; 363/21; 363/97
[58] Field of Search ........................ 363/17, 21, 71, 72, 363/80, 98, 65; 323/271; 307/71

[56] References Cited

U.S. PATENT DOCUMENTS

| 3,443,194 | 5/1969 | Cielo | 363/20 |
| 4,062,057 | 12/1977 | Perkins et al. | 363/71 |
| 4,177,389 | 12/1979 | Schott | 307/64 |
| 4,195,333 | 3/1980 | Hedel | 363/21 |
| 4,339,704 | 7/1982 | McSparran et al. | 307/71 X |
| 4,347,558 | 8/1982 | Kalinsky | 363/98 X |

FOREIGN PATENT DOCUMENTS

| 1921357 | 4/1969 | Fed. Rep. of Germany . |
| 2530631 | 1/1977 | Fed. Rep. of Germany . |
| 2738838 | 3/1979 | Fed. Rep. of Germany . |
| 2819676 | 12/1979 | Fed. Rep. of Germany . |
| 3133578 | 3/1983 | Fed. Rep. of Germany . |
| 1065997 | 7/1984 | U.S.S.R. . |

Primary Examiner—Patrick R. Salce
Assistant Examiner—Emanuel Todd Voeltz
Attorney, Agent, or Firm—Hill, Van Santen, Steadman & Simpson

[57] ABSTRACT

A circuit for high output autoconverters in a power supply wherein two flow autoconverters are connected with their outputs in parallel and their inputs in series has a control unit for monitoring the relative input partial voltages of the autoconverters and controlling the transmission factor of the autoconverters in response thereto, such as by pulse duration modulation, such that the partial voltages differ from each other only within a given band width. The demagnetization winding of each autoconverter may additionally be connected to the input of the other autoconverter so that the autoconverter absorbing the higher magnetization current increases the input of the other autoconverter, and vice versa.

10 Claims, 2 Drawing Figures

CIRCUIT ARRANGEMENT FOR AUTOCONVERTERS

BACKGROUND OF THE INVENTION

1. Field of the Invention

The present invention relates to autoconverters utilized in power supply devices, and in particular to a circuit arrangement for connecting two autoconverters in a switched power supply.

2. Description of the Prior Art

Power supply devices having autoconverters are generally known. So-called switched power packs have become particularly widespread, wherein an input d.c. voltage (usually a rectified line voltage) is periodically connected with relatively high frequency to an inductance by means of a load switch, preferably in the form of a semiconductor element. The inductance in turn supplies a user with power during blocking phases of the load switch. Two basic types of autoconverters are utilized, namely blocking and flow autoconverters. These two types are essentially differentiated in that the inductance is disposed in a shunt branch of a blocking autoconverter, and in a series branch of a flow autoconverter. In the case of a blocking autoconverter, the load resistor is fed exclusively by the discharge current of the inductance, whereby the current pauses are bridged from a capacitor connected in parallel with the load resistor. In the case of a flow autoconverter, the load resistor is supplied with the charging current of the inductance during the conducting phase of the load switch, and continues to be fed by the discharge current of the inductance through a diode during the non-conducting or off phase of the load switch. Autoconverter circuits further generally include a transformer for galvanic separation of the input or output circuit. In a blocking autoconverter, this isolating transformer may simultaneously form the storage inductance.

In addition to depending upon the voltage ratio of an isolating transformer which may be provided, the output voltage of an autoconverter depends on the so-called keying ratio, that is, the pulse duty factor with which the load switch is switched on and off. The output voltage may, therefore, be controlled with respect to a predetermined value by modifying the keying ratio. It is known to operate the load switch at a constant frequency and to control the output voltage by means of pulse duration modulation of the switch pulses of the load switch. It is known from German OS No. 2520631 in this manner of operation to limit the region within which a pulse duration modulation is possible as a function of the input d.c. voltage, in order to prevent an overload of the respective components.

Blocking converters are generally utilized for comparatively low outputs, whereas flow autoconverters are suitable for building switched power supplies of moderate and higher outputs. High output switched power packs are known wherein two flow autoconverters are connected in parallel at their inputs and outputs. This arrangement, referred to as a "push-push converter" is essentially characterized by the two load switches being switched with a chronological offset, so that the ripple of the output current has twice the frequency as in a normal (single-ended) flow autoconverter.

The power which is transmittable by switched power packs constructed with autoconverters is limited by the load handling capability of the available load switches, which are generally formed by transistors. The limit established by the current handling capability of these switch elements may be overcome by connecting two or more autoconverters in parallel as described above. Another limit on the transmittable power is caused by the feed network. Conventional switched power packs are supplied from a rectified 220 volt single-phase alternating voltage. Commercially available switching transistors, usable as load switches, are suitable for this voltage and for current loads corresponding to a power pack output of up to 2 kV. Higher outputs cause undesirable influences on the feed network, for example, as a consequence of the unavoidably high input capacitance, a very large non-linear distortion factor of the current results, a very high cut-in current surge also occurs, and the neutral conductor is very highly loaded given a single-phase mains connection.

These disadvantages suggest feeding extremely high power output switched power packs with a three-phase network. Connection to, for example, a 380 volt network, however, requires a correspondingly higher rectified input voltage for the autoconverter. If a switched power pack to be supplied with a three-phase network were constructed using flow autoconverters, transistors having a maximum collector, emitter voltage of approximately 1600 volts would be necessary for use as load switches. Components having such current handling capability and switching speeds are not commercially available at present.

SUMMARY OF THE INVENTION

It is an object of the present invention to provide a circuit for autoconverters which enables the use of load switches having a voltage handling capability which is lower than the expected peak voltages which may appear during operation with a given supply network, so that either the feed input voltage can be increased by using switching transistors having the highest voltage handling capability available (and thus, permitting operation with a three-phase network) or, given a network with a lower voltage, switching transistors having higher current handling capabilities can be employed.

This object is inventively achieved in a circuit for autoconverters having a control means for leveling deviations in the input and/or output voltage by influencing the transmission characteristic of the autoconverter, such as, for example, by varying the pulse duty factor (keying ratio) of an electronic load switch disposed in a series arm of the autoconverter. At least two autoconverters are provided, the autoconverters acting on a common load at their outputs, and being connected in series at their inputs. The control means operate in dependence on the partial input voltages supplied to the respective autoconverters from the feed input d.c. voltage such that relative deviations of these partial voltages are leveled when the deviations exceed a prescribed amount.

Connecting two or more autoconverters at their inputs in series cannot be accomplished without undertaking further measures because, even with the greatest possible structural identity of the autoconverters, a uniform division of the input voltage to the respective inputs of the autoconverters is impossible. Only when relative deviations between the partial voltages supplied to the respective inputs are leveled in accordance with the present invention, can the series connection be made. This in turn results in the individual components of each autoconverter being loaded based only on the particular partial voltage supplied thereto.

One embodiment of the invention makes use of conventional control devices for controlling the output voltage and for leveling deviations of the partial voltage. This control device undertakes, for example, pulse duration modulation by undertaking a comparison wherein the pulse duration of at least one of the autoconverters is variable based on the measure of deviations of the relative partial voltages of this autoconverter.

The leveling preferably occurs in such a manner that a decrease in the pulse duty factor is produced for the load switch of that autoconverter whose input partial voltage falls below a selected limit value.

If the autoconverters of the circuit are flow autoconverters with isolating transformers, effective leveling of relative fluctuations of the input partial voltages of the individual autoconverters can be accomplished by suitable connection of the demagnetization winding of the isolating transformer for each autoconverter to the input of the other autoconverter. The demagnetization windings of the respective isolating transformers absorb the magnetization energy from the associated transformer core during the conducting phase of the associated load switch. This energy can be returned to the input of the other autoconverter during the blocking or nonconducting phase of the load switch of the other autoconverter. The magnetization energy from one autoconverter is thus fed back to the input of the other autoconverter.

Because the balancing of the circuit effected by the crossed feedback of the magnetization energy is very effective, a relatively wide tolerance range or band can be prescribed for the control unit, so that this electronic control ensuing, for example, by means of additional pulse duration modulation, only need exercise a limiting function which takes effect only when the balancing by the crossed feedback of the magnetization energy no longer suffices for balancing. An advantage of the use of the control unit in this manner is that the control unit need not take effect for relatively small deviations in the balancing. This is important because the output voltage of the autoconverters is superimposed with noise voltages resulting from the engagement of the electronic control unit, the noise voltages causing disruptions in the other circuitry and eliminating the noise voltages requires additional outlay.

DESCRIPTION OF THE PREFERRED EMBODIMENTS

Figure 1:
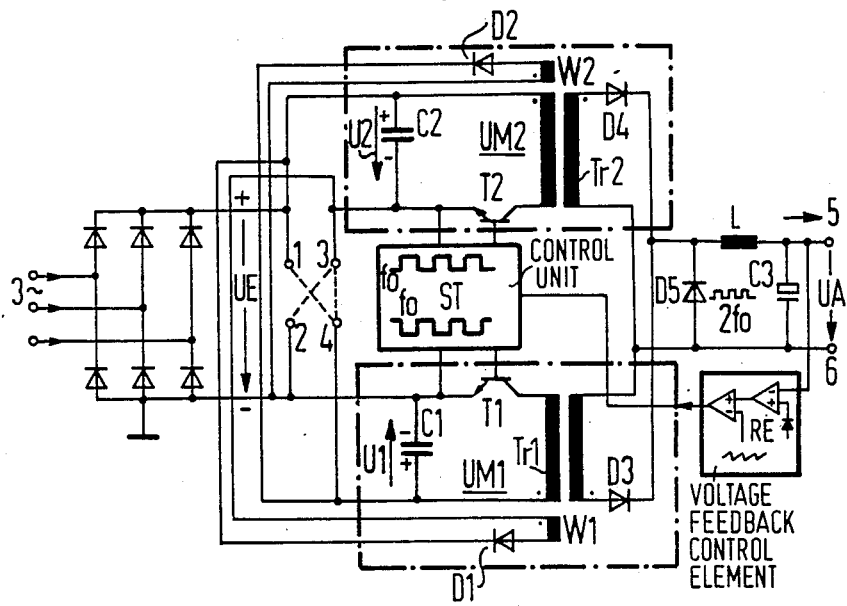
FIG. 1 is a schematic circuit diagram employing two flow autoconverters constructed in accordance with the principles of the present invention.

A circuit diagram is shown in FIG. 1 for a power supply having two identical autoconverters UM1 and UM2. Each of these autoconverters includes a load switch formed by respective transistors T1 and T2, as well as respective isolating transformers Tr1 and Tr2. The load switches T1 and T2 are respectively connected in the primary circuit of the associated isolating transformer Tr1 or Tr2. The secondary windings of the transformers Tr1 and Tr2 are respectively connected in parallel to each other through respective decoupling rectifiers D3 and D4, and act in common on a load connectable to output terminals 5 and 6 of the circuit. A storage inductance L is connected in the output circuit leading to the terminals 5 and 6. A diode D5 and a storage capacitor C3 are also connected in the ouput circuit.

The isolating transformers Tr1 and Tr2 of the two autoconverters UM1 and UM2 include respective demagnetization windings W1 and W2, which are connected through respective decoupling rectifiers D1 and D2 to respective capacitors C2 and C1 provided in the other autoconverter.

The load switches T1 and T2 are periodically driven with a frequency fo by a common control unit ST. The drive of the switches T1 and T2 is push-pull, such that the two load switches are alternately switched on and off, that is, conducting and nonconducting. This manner of operation is known from so-called dual flow autoconverters and results in current pulses having a frequency 2fo, that is, twice the drive frequency, are effective in the output circuit.

Driving of the load switches T1 and T2 by the control unit ST is under the influence of a further control element RE, by means of which the output voltage at the terminals 5 and 6 is monitored. The influence of the further control element RE on the control unit ST is preferably in the form of a pulse duration modulation of the steady frequency drive pulses for the load switches.

The control unit ST is also influenced by the input partial voltages U1 and U2 respectively appearing across the input capacitors C1 and C2 of the two autoconverters UM1 and UM2. The influence of these partial voltages will be explained in greater detail below with reference to FIG. 2.

The series connected inputs of the autoconverters UM1 and UM2 are fed through common input terminals 1 and 2 with an input d.c. voltage UE which is acquired by rectification from a three-phase network.

Figure 2:
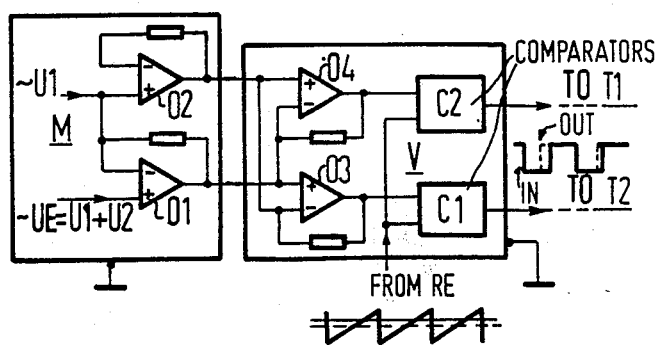
FIG. 2 is a block diagram of a control circuit for electronic balancing of the input partial voltages of the two autoconverters usable in the embodiment of FIG. 1.

The electronic control circuit shown in FIG. 2, as mentioned above, influences the control unit ST in dependence on the input partial voltages U1 and U2 and includes a measuring circuit M and a comparison circuit V for the pulse duration modulation.

The measuring circuit M in FIG. 2 includes two operational amplifiers 01 and 02. The inverting input of the amplifier 01 is supplied with a proportional partial voltage derived from the partial voltage U1. The noninverting input of the amplfier 01 is supplied with a proportional measuring voltage derived from the sum U1+U2=UE of the two input partial voltages, so that the difference between its two input signals, that is, a measuring voltage proportional to the input partial voltage, appears at the output of the amplifier 01.

The operational amplifier 02 of the measuring circuit M functions as an impedance transformer. Its noninverting input is supplied with a proportional measuring voltage derived from the input partial voltage U1 of the autoconverter UM1, so that a corresponding low resistance measuring voltage is available at its output. The outputs of the operational amplifiers 01 and 02 are cross-connected to the respective inverting and noninverting inputs of two further operational amplifiers 03 and 04 in the comparison circuit V. In the comparison circuit V, the differences between the two input partial voltages U1 and U2 (technically the differences between the proportional measuring voltages) with different operational signs are amplified. A positive output signal thus appears at the output of the amplifier 03 when U2 is greater than U1, and a negative output signal appears when U1 is greater than U2. The output signal of the operational amplifier 04 behaves inversely.

The outputs of the operational amplifiers 03 and 04 are respectively connected to the input of comparators C1 and C2. The other inputs of these comparators C1 and C2 are supplied in common with a saw-tooth voltage. Pulse sequences having a keying ratio (pulse duty factor) appear at the outputs of the comparators C1 and C2, with the ratio or duty factor being dependent upon the output signals from the operational amplifiers 03 and 04, that is, dependent on the measure of the difference between the input partial voltages U1 and U2. These pulse sequences are used for driving the respective load switches T1 and T2 in the circuit of FIG. 1.

The complete operation of the circuits shown in FIG. 1 and FIG. 2 is as follows. It will be assumed that the autoconverters UM1 and UM2 shown in FIG. 1 are identically designed. It will also be assumed for the moment that the partial voltages U1 and U2 across the input capacitors C1 and C2 are identical, and are each one-half of the input voltage UE acquired from the three-phase network by rectification. When the load switch T1 of the autoconverter UM2 is driven to a conducting state by the control unit ST, current from the input source, that is, from the capacitor C1 flows across the primary winding of the isolating transformer Tr1. A current having a polarity for which the decoupling rectifier D3 is transmissive is induced in the secondary winding of this isolating transformer, so that current flux through the storage inductance L, and through the load resistor connected to the output terminals 5 and 6, occurs. When the load switch T1 is switched off again, and before the load switch T2 of the other autoconverter UM2 (operated in push-pull fashion) is switched on, the load connected to the output terminals 5 and 6 is fed by the magnetic energy stored in the inductance L. This proceeds through the diode D5. As soon as the load switch T2 switches to a conducting state, current flows from the secondary winding of the isolating transformer Tr2 through the decoupling rectifier D4 and the inductance L to the load connected to the output terminals 5 and 6. The diode D5 becomes nonconducting. Deviations of the output voltage UA from a prescribed rated value are detected by the control element RE and cause a corresponding change in the pulse duty factor in the control unit ST.

During the block phase of one of the load switches T1 or T2, the magnetic energy stored in the associated isolating transformer is fed back through one of the windings W1 or W2 into the input capacitor C2 or C1 of the other autoconverter. As a consequence of this crossed feedback, a balancing of the circuit operation occurs, that is, if the input voltage U1 of the autoconverter UM1 is greater for some reason than the input voltage of the other autoconverter UM2, the input voltage of UM2 is increased by the feedback. Because the magnitude of the magnetization energy is proportional to the square of the respective input voltage, this balance is very effective, with the autoconverter supplying correspondingly more charge to the autoconverter having the momentarily lower input voltage.

If the asymmetry of the two input partial voltages U1 and U2 reaches the limits of a prescribed tolerance range, the circuit shown in FIG. 2 is activated. The measuring voltages appearing at the output of the operational amplifiers 01 and 02, which are proportional to the input partial voltages U1 and U2, are subtracted from each other in the operational amplifiers 03 and 04. The corresponding differences cause pulse duration modulation, with the assistance of the comparators C1 and C2 in such a fashion that the on-phase of the load switch is shortened in that autoconverter whose input partial voltage has dropped below the prescribed level. The other autoconverter is not influenced. By shortening the on-phase, less current is taken from the associated input capacitor for that autoconverter, so that the asymmetry is at least partially leveled.

A switch-over possibility is shown in FIG. 1 indicated by the dashed-line connection between input terminals 1 and 4, and input terminals 2 and 3. When this connection is effective, and the connection between the input terminals 3 and 4 is interrupted, the inputs of the two autoconverters UM1 and UM2 are not connected in series, but are instead connected in parallel. The autoconverter arrangement in this state can be operated at a correspondingly lower line voltage, whereby it functions as a dual flow autoconverter.

The inventive concept disclosed and claimed herein is not limited to the exemplary embodiment described above. For example, more than two autoconverters may have their respective inputs connected in series, and corresponding monitor devices may be utilized to insure that the input partial voltages of the individual autoconverters do not exceed the permissible maximum values. The corresponding voltage balancing can be undertaken by a control device which may be present for leveling fluctuations in the output voltage, or may be undertaken by a special control device dedicated to that purpose. The input partial voltages need not necessarily be identical, but may depart from each other based on a measure of the load handling capability of the switching elements utilized.

Although the circuit described above is preferably employed in high output autoconverter arrangements and in flow autoconverters, it can also be employed with advantage to other types of autoconverters, for example, blocking autoconverters, when these are to be operated at an input voltage which is higher than the voltage capability of commercially available semiconductor components, or when components having relatively lower load handling capability than the highest commercially available components are to be employed for cost reasons.

The change in the transmission factors of the autoconverters for the purpose of leveling fluctuations in the individual partial voltages need not necessarily be achieved by means of pulse duration modulation. Other types of influencing are also possible. It is similarly not necessary that the crossed magnetic feedback, which is possible in the case of flow autoconverters, be combined with an electronic control of the input partial voltage as described in the exemplary embodiment. The two types of control may be individually utilized.

Other changes and modifications may be suggested by those skilled in the art, however, it is the intention of the inventor to embody within the patent warranted hereon all changes and modifications as reasonably and properly come within the scope of his contribution to the art.

I claim as my invention:

1. A circuit for use with a d.c. input feed comprising:
    two autoconverters each having outputs connected to a common load, each having inputs connected in series to which respective portions of said d.c. feed comprising the total of said feed are supplied, each having an internal series branch including an electronic load switch operated with a control pulse sequence, and each having a characteristic transmission factor; and control means including comparator means for said autoconverters connected to said inputs and to said load switches and a measuring circuit having respective inputs to which one of said input feed portions and said total d.c. feed are supplied, said measuring circuit having means for deriving the other of said input feed portions by subtracting the supplied feed portion from the total d.c. feed and for generating control voltages proportional to each of said input feed portions, said comparator means having two comparators to which said control voltages are respectively supplied, said comparators respectively connected to the load switches of said autoconverters for decreasing the pulse duty factor of either of said autoconverters whose input feed portion is less than the input feed portion of the other autoconverter, thereby respectively operating said load switches dependent upon the magnitude of said portions of said feed at said autoconverter inputs to change the transmission factor of one of said autoconverters for leveling any deviations among the autoconverter input feed portions which exceed a selected amount prescribed by said comparator means.

2. A circuit as claimed in claim 1 wherein said load switches are electronic load switches operated with a constant pulse frequency, wherein said control means is connected via a feedback path to an output of said circuit, and wherein said control means changes the transmission factor of said autoconverters by pulse duration modulation of the electronic load switches in response to feedback from said circuit output and in response to the output of said comparator means.

3. A circuit as claimed in claim 2 wherein said comparator means reduces the pulse duration for the load switch of one of said autoconverters whose input feed portion falls below a selected limit.

4. A circuit as claimed in claim 2 wherein said comparator means increases the pulse duration of the load switch for one of said autoconverters whose input feed portion exceeds a selected limit.

5. A circuit as claimed in claim 1 wherein said autoconverters are flow autoconverters having outputs connected in parallel to said common load and having load switches operated with a constant and identical pulse frequency, said load switches being engaged in chronological sucession in the manner of a dual flow autoconverter.

6. A circuit as claimed in claim 1 wherein said autoconverters are flow autoconverters each having an isolating transformer, each isolating transformer having a demagnetization winding connected to the input of a different autoconverter such that the magnetization energy absorbed by the isolating transformer core of one autoconverter during operation thereof is fed to the input of said different autoconverter after said one autoconverter is switched off and before said different autoconverter is switched on.

7. A circuit as claimed in claim 1 further comprising a switching means connected to the inputs of said autoconverters for selectively connecting said autoconverter inputs to said d.c. feed in parallel.

8. A circuit as claimed in claim 7 wherein said switching means further includes means for selectively connecting said autoconverters in parallel to said d.c. feed in groups.

9. A method for operating a power pack supplied with a d.c. feed having a plurality of autoconverters each having outputs connected to a common output circuit of said power supply inputs connected in series to said d.c. feed with portions of said d.c. feed comprising the total of said d.c. feed being respectively supplied to said inputs, each having a series branch with a load switch therein, each having a characteristic transmission factor, said method comprising the steps of:

comparing the input feed portions supplied to each autoconverter;

normally operating said load switches by identical control pulses of constant frequency; and changing the transmission factor of one of said autoconverters if the input feed portion of said one autoconverter deviates by more than a selected amount from the input feed portion of another of said autoconverters to level said deviation by modulating the control pulse sequence of the load switch for said one autoconverter by decreasing the pulse duty factor of the control pulse sequence for said one autoconverter if its input feed portion falls below a selected limit and increasing the pulse duty factor of the control pulse sequence for said one autoconverter if its input feed portion exceeds said selected limit.

10. A method as claimed in claim 9 wherein each autoconverter further has an isolating transformer with a core and a demagnetization winding, comprising the additional steps of:

connecting the demagnetization winding of each autoconverter to the input of a different autoconverter;

operating said autoconverter in a sequence; and supplying magnetization energy from the transformer core of one of said autoconverters to the input of the next autoconverter to be operated in said sequence in the period after said one autoconverter is switched off and before said next autoconverter is switched on.

* * * * *